United States Patent [19]

Hyams

[11] Patent Number: 4,572,195
[45] Date of Patent: Feb. 25, 1986

[54] METHOD OF FORMING SEAMLESS FABRIC CUPS AND RESULTING PRODUCTS

[75] Inventor: Seymour Hyams, Baldwin, N.Y.

[73] Assignee: Wiener Laces, Inc., New York, N.Y.

[21] Appl. No.: 571,682

[22] Filed: Jan. 18, 1984

[51] Int. Cl.$^4$ ............................................. B32B 31/20
[52] U.S. Cl. .................... 128/463; 128/464; 128/481; 128/516; 128/517; 156/245; 156/306.3; 156/344; 264/258; 264/292
[58] Field of Search ................ 156/93, 196, 212, 245, 156/306.3, 344; 128/463, 464, 481, 492, 494, 516, 517; 264/241, 257, 258, 292

[56] References Cited

U.S. PATENT DOCUMENTS

| | | | |
|---|---|---|---|
| 2,285,967 | 6/1942 | Hardy | 264/292 |
| 2,304,989 | 12/1942 | Snowdon | 264/258 |
| 2,867,889 | 1/1959 | Thompson | 264/292 |
| 3,058,154 | 10/1962 | Howard et al. | 264/258 |
| 3,070,870 | 1/1963 | Alexander et al. | 128/463 |
| 4,375,445 | 3/1983 | Cole et al. | 264/292 |
| 4,398,981 | 8/1983 | Ellis | 156/245 |

Primary Examiner—Caleb Weston
Attorney, Agent, or Firm—Roberts, Spiecens & Cohen

[57] ABSTRACT

A sheet of embroidered lace material or the like is temporarily attached to a relatively heat and stretch resistant fabric and subjected to a heat molding process to form a cup in the lace material. The design in the edge of the lace material to which the heat and stretch fabric is attached is held against deformation by the fabric so that the cup is formed with minimum deformation of the design. Thereafter the cup is cut into shape.

23 Claims, 4 Drawing Figures

METHOD OF FORMING SEAMLESS FABRIC CUPS AND RESULTING PRODUCTS

FIELD OF THE INVENTION

This invention relates to molding methods and more particularly to methods of molding seamless fabric edges for brassieres, slips, camisoles and the like. The invention also relates to associated products.

BACKGROUND

In the formation of cups for brassieres, slips, camisoles and the like, seamless structures are preferred because seams may cause discomfort and abrasion to sensitive tissues. Seams, moreover, may result in puckering of the fabric, may open to cause gapping and are undesirable for many other reasons.

As a consequence of the above-indicated faults, many attempts have been made to develop seamless edges and these atempts have mainly utilized molding techniques which have not hitherto been successful.

One of the principal reasons for the lack of success of the edge molding techniques which have been tried is the pattern distortion which results. This is particularly emphasized with edges in which, for example, scalloped designs or the like become distorted to the extent that they are not useful.

SUMMARY OF THE INVENTION

It is an object of the invention to provide molding methods, especially suitable for molding brassiere cups and the like while minimizing distortion at the edges thereof.

Still another object of the invention is to provide improved seamless cups especially suitable for use in female garments.

Yet another object of the invention is to provide improved garments embodying three-dimensional structures wherein design distortion is avoided particularly wherein such distortion would be most apparent.

To achieve the above and other objects of the invention, there is provided a method for the forming of a sheet of material into a three-dimensional product which comprises holding an edge on the aforementioned sheet of material while forming the sheet between male and female mold members. More particularly, the material is selected to be of a type which is permanently deformable by the mold members upon an application of heat within a molding range while the edge of the material is held with a sheet of material which is not permanently deformable by the application of heat within this range. The sheets are preferably of fabric and the sheet of moldable material will be, for example, a sheet of polyester lace within which is contained a design. The material may also, for example, be a sheet of embroidered material which is molded or deformable upon the application of heat thereto.

In accordance with the invention, the sheets are temporarily connected to each other so that the sheets may be separated from one another after the three-dimensional product is formed, at least, in part. Thus, for example, the sheets of fabric may be tacked to each other by easily removable chain stitches of a well known type.

According to a preferred embodiment of the invention, the first sheet referred to above may include two parts which are bridged by and connected to the second mentioned sheet. The material may be polyester which is suitably formed within a molding temperature range of about 385°–400° F. The molding members may, for example, be applied for a duration of about 20 to 50 seconds. The second mentioned sheet may be, for example, a felted or matte fabric.

The heating referred to hereinabove may be effected by juxtaposing a heating unit to the fabric to be formed and the mold members may be applied in relatively cool condition. Alternatively, the fabric may be heated by the mold members themselves which may be applied in heated condition.

According to a further step of the invention, the cup may be cut out of the thusly formed sheet and a plurality of such cups thusly formed may be sewn or otherwise connected together.

In accordance with the invention, the products made according to the above procedures are also to be deemed a part of the invention herein.

The above and other objects, features and advantages of the invention will be found in the following detailed description as illustrated in the accompanying drawing.

DETAILED DESCRIPTION

As has been generally noted above, it is an object of the invention to provide a seamless or molded finished edge on brassieres, bra slips, camisoles, teddies and so forth. To obtain an end product, two edged sheets are joined with a so called bridge fabric. The joining is effected preferably by the use of chain stitching so as to provide for a pull-away operation to obtain the end product. The chain stitching is done in well known fashion automatically by a multi-needle sewing machine. The intermediate product thus obtained is placed into a frame by pinning or clamping. Pins or clamps hold the fabric in place to ensure an end quality product. The frame with the pinned or clamped fabric thereon is placed into a molding machine. Cold or hot molding may be employed. The molds are, according to well-known technique, preferably of aluminum. According to the cold molding technique, a heating element is passed over the fabric thus melting the fabric at a desired temperature range. Cold molds then sandwich the fabric and thereby create bra cups or the like. According to the hot molding procedure which may be alternatively employed, fabric is placed into a frame and placed between heated mold members. The hot molds then sandwich the fabric to form bra cups or the like.

As will be discussed in detail hereinbelow and after the cups have been formed, they are then die cut to a specific design pattern. This pattern may change as styles change. The die cut piece still has at least part of the bridge fabric stitched to the garment fabric. A thread draw operation may be then performed by hand removing whatever bridge fabric is left over thereby resulting in the finished product.

All of the sheets, as indicated above, are preferably of fabric and the fabrics may be of various types. Preferably the garment fabric and the bridge fabric are of polyester. The bridge fabric particularly may be of a natural fabric thereby to resist the heat which is applied to the garment fabric in order to mold the same.

Figure 1:
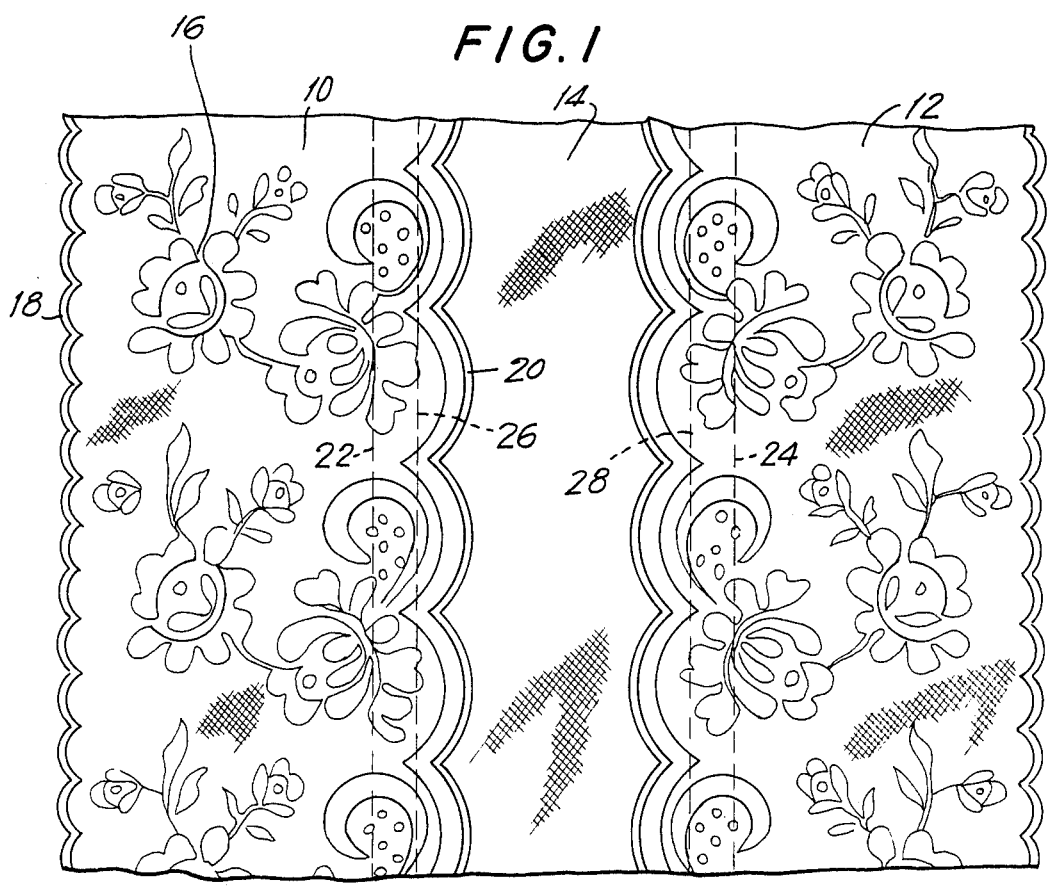
FIG. 1 is an illustration of two sheets of lace bridged by a holding sheet preparatory to a molding operation in accordance with the invention.

Referring next to the drawing and particularly to FIG. 1, therein is illustrated an arrangement of sheets of material to provide for molding operations in accordance with the invention. At 10 and 12 are indicated sheets of thermally moldable material which are bridged by an intervening sheet 14 which is of relatively non-moldable material. For purposes of definition, sheets 10 and 12 may be regarded as parts of the same sheet. This means simply that both are parts of a similar or identical material, both of which are molded upon application of heat in a given temperature range thereto. Sheet 14 which is the bridging sheet is of a material which may or may not mold. Molding normally requires the application of pressure by molding members as will be described hereinbelow.

Sheet or part 10 will preferably be in the form of a pattern sheet. Thus, for example, sheet 10 may be a sheet of polyester lace having a pattern such as indicated at 16. Sheet 10 will have scalloped edges or other decorative edges such as indicated at 18 or 20. While polyester has been indicated, any synthetic or plastic material is also suitable for use as sheet 10 and the object of the invention will be to minimize distortion particularly of the pattern in or adjacent the scalloped edges 18 and 20 and particularly adjacent the scalloped edge 20. Sheet or part 12 will be similarly constructed and, hence, no separate discussion is warranted with respect to the construction of the sheet 12.

Bridging sheet 14 may be of a wide variety of materials provided that the characteristics thereof will assure that the sheet 14 will prevent distortion at the edge 20 during a thermal molding operation. The edges of sheet 14 are indicated at 22 and 24. The sheets 10 and 12 may be joined to sheet 14 along a line 26 and a line 28. Lines 26 and 28 preferably indicate a line of chain stitches. These chain stitches may be applied by a multineedle machine in well known manner which does not require discussion in this text. The resulting chain stiches may be readily removed after the molding and/or cutting operation which ensues. By these means or by an adhesive or the like, the bridging sheet 14 is readily connected to and detached from sheets or parts 10 and 12 when desired and without harming the fabric of sheets 10 and 12 in any manner whatsoever. The bridging sheet 14 may, for example, be woven fabric, knitted fabric or matte or felted fabric or the like. As has been indicated, it is essential that this material be able to withstand molding resulting from the application of heat in a range which is intended to enable a molding of sheet 10 and 12.

Figure 2:
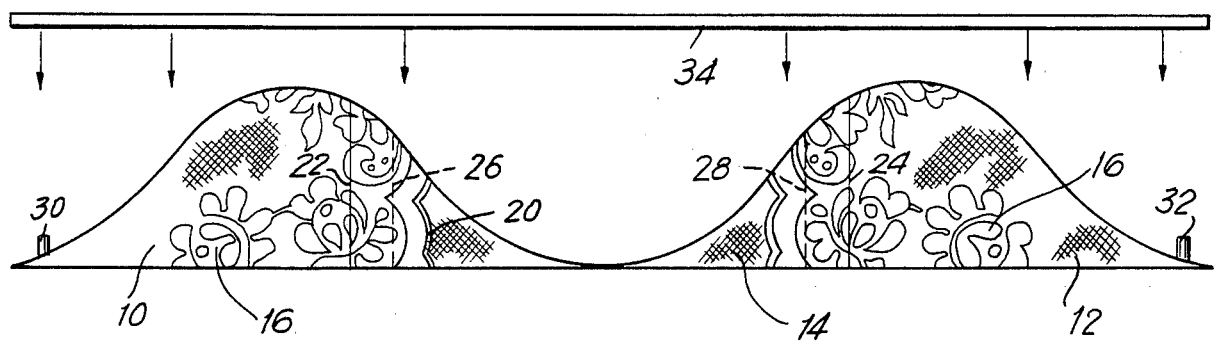
FIG. 2 is a diagrammatic illustration of the bridged sheets of fabric of FIG. 1 being molded in accordance with the invention.

Referring next to FIG. 2, therein is diagrammatically illustrated the bridging fabric at 14 and the sheets or parts 10 and 12 with the pattern 16 therein. Edges 18 and 19 are held by pins or clamps indicated at 30 and 32. Heat is applied by a juxtaposed heating element diagrammatically indicated at 34. Edges 20 are indicated as overlapping with the edges 22 and 24 of the bridging sheet 14. The application of molding members converts the sheets or parts 10 and 12 into concave or convex members which constitute molded cups.

Figure 3:
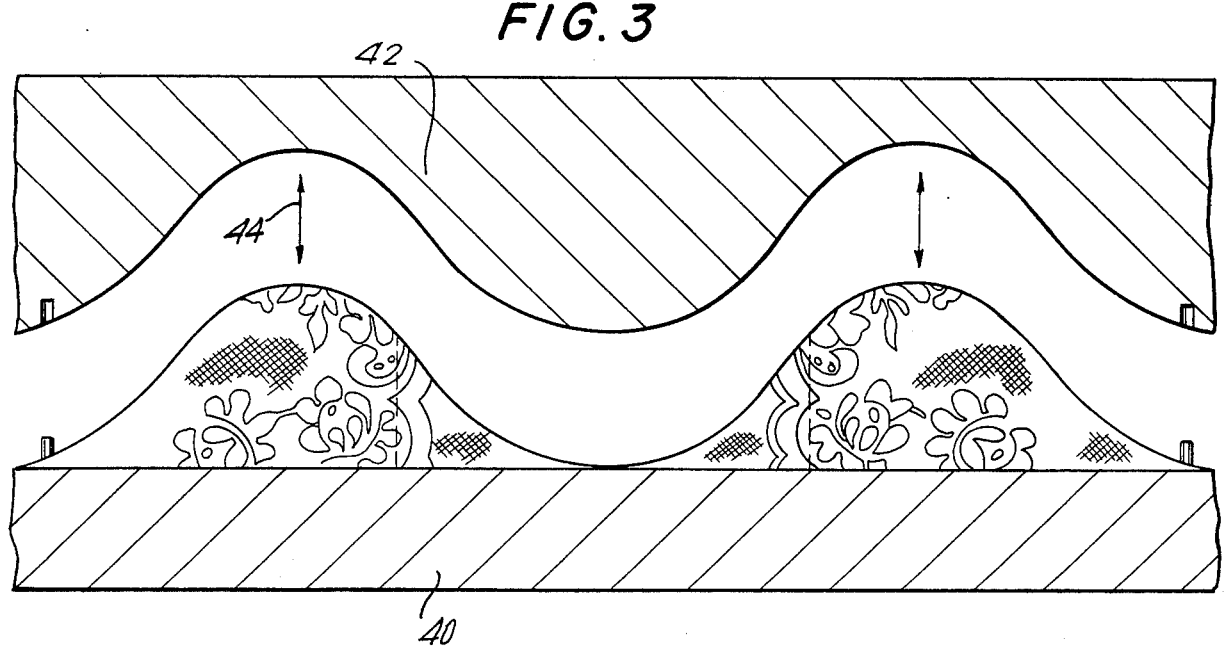
FIG. 3 is a diagrammatic illustration of a molding operation employed in accordance with the invention.

The molding members are indicated in FIG. 3. These include the male molding member 40 and the female molding member 42 which are reciprocally movable in a relative sense as indicated by arrow 44. Edges 20 are located at positions withdrawn within the concave and convex portions of these molding members. In the embodiment illustrated in FIG. 3 contrasted to that illustrated in FIG. 2, the molding members 40 and 42 themselves may be heated. This therefore constitutes the hot molding method in which the cups are formed by the direct rather than by the indirect application of heat.

Figure 4:
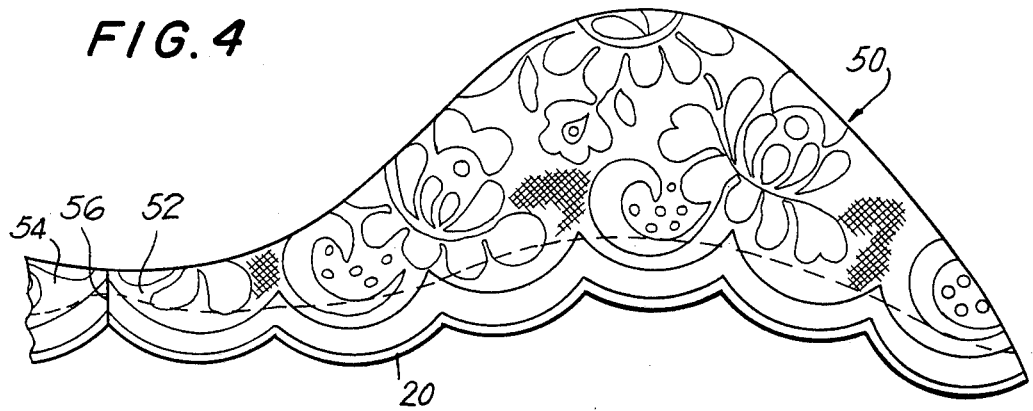
FIG. 4 is partially broken away view of a product which is formed in accordance with the invention.

Assuming that one cup is molded in sheet or part 10 and another cup is molded in sheet or part 12 as illustrated in FIG. 2, appropriate shapes may be subsequently cut out of these sheets or parts as indicated at 50 in FIG. 4. These cups may have extensions such as indicated at 52 and 54 which are seamed or otherwise joined together as indicated at 56. Thereby, a pair of brassiere cups will be formed which are suitable for incorporation into a garment such as a slip or camisole or the like. Alternatively, straps may be conventionally affixed to the cups in a conventional manner to form a brassiere type garment which constitutes the end product.

By the above method, distortion is essentially entirely prevented in the vicinity of scalloped edge 20. A scalloped edge is used by way of example only, inasmuch as the edge need not be scalloped but may be of any other design or pattern as desired. Some distortion will occur in the central portion of the cup with respect to the pattern therein. This distortion will not constitute a visual detriment inasmuch as the cup, itself, has a concave or convex form in this area. It is essential for visual purposes to avoid distortion adjacent the edge indicated at 20 since this will be most visually apparent. The invention achieves this by utilization of the bridging material as aforesaid.

It will now appear from what has been stated above that the invention involves the joining of two pieces of thermally moldable material by a bridge of material which preferably will not deform under thermal conditions suitable for molding of the other pieces. It will also be obvious from the above description that it is not necessary to use the bridging sheet of material for purposes of bridging since it may simply be bound to one edge only of the material to be molded while still performing the same purpose. The material to be formed may be of various types of fabric but, preferably, polyester fabric in the form of a sheet of lace having an intricate pattern therein is preferred. The material may be woven or non-woven, tricot, net, etc. The bridging fabric or its equivalent may be woven, knitted or matte or felted material, the function of which is to prevent distortion particularly at the edges of the material being formed into concave or convex shape. The bridging or anchoring material holds the trim in position at a specified place. It is the key to the entire process and is tacked on for easy removal. The tacking may be effected automatically or by hand, it may be constituted by chain stitching or the like. While chain stitching has been referred to above, the tacking may be effected by means of an adhesive such as is sonically activated or which may, in the alternative and by way of example, only be a pressure sensitive adhesive. The bridging material must preferably be removable from the fabric which is to be formed into the final product. It is to be noted that the fabric which is to be formed to the final product can, in fact, be more than one fabric and thus may be formed of combinations thereof. While female garments have been indicated, the process indicated herein is applicable not only to brassieres and the like, but also to bikini bottoms, panties, athletic supports and the like. Any product which could be made by heating and molding a polyester fabric or the like is suitably related to the invention.

The molding process of the invention is preferably, but not necessarily, conducted in a range of about 250° to 550° F. The molding pressure is preferably applied for about 25 to 37 seconds. A range of 20 to 65 seconds and even greater, if needed, is within the scope of the invention. In accordance with the invention, gang molding rather than single molding is definitely possible. The bridging material is preferably a discardible material of low cost and ready availability.

There will now be obvious to those skilled in the art many modifications and variations of the molding techniques and products described hereinabove. These modifications and variations will not depart from the scope of the invention if defined by any of the following claims.

What is claimed is:

1. A method for the molding of a first sheet of material into a three-dimensional product, said method comprising holding an edge of said sheet in position while forming said sheet between male and female mold members, the edge being located between said mold member, said first sheet of material being permanently molded by said mold members and with the application of heat within a molding range, said member further comprising holding said edge by temporarily connecting the first sheet of material with a second sheet of material which resists being permanently molded by the application of heat within said range and by holding the edge of the first sheet of material in position by means of said second sheet of material, and separating the sheets from each other after said first sheet is formed.

2. A method as claimed in claim 1, wherein said mold members include concave and convex portions, comprising positioning said edge between the concave and convex portions.

3. A method as claimed in claim 1 wherein said sheets are of fabric.

4. A method as claimed in claim 1 wherein the sheets are connected to each other in partially overlapping relation.

5. A method as claimed in claim 1 wherein the sheets are tacked to each other by chain stitches.

6. A method as claimed in claim 3 wherein said first sheet includes two parts which are bridged by and connected to the second said sheet.

7. A method as claimed in claim 1 wherein said first sheet is of polyester lace.

8. A method as claimed in claim 6 wherein said first sheet is of polyester lace.

9. A method as claimed in claim 7 wherein the molding temperature is about 250°–550° F.

10. A method as claimed in claim 9 wherein the molding members are applied for about 20–65 seconds.

11. A method as claimed in claim 8 wherein the molding temperature is about 250°–550° F.

12. A method as claimed in claim 11 wherein the molding members are applied for about 20–65 seconds.

13. A method as claimed in claim 5 wherein said second sheet is of felted fabric.

14. A method as claimed in claim 6 wherein said second sheet is of felted fabric.

15. A method as claimed in claim 5 wherein said first sheet is heated by juxtaposing a heating unit thereto and then the sheet is formed by mold members in relatively cool condition.

16. A method as claimed in claim 6 wherein said first sheet is heated by juxtaposing a heating unit thereto and then the first sheet is formed by mold members in relatively cool condition.

17. A method as claimed in claim 5 wherein said first sheet is heated by the mold members which are heated.

18. A method as claimed in claim 6 wherein said first sheet is heated by the mold members which are heated.

19. A method as claimed in claim 6 comprising cutting a brassiere-type cup out of each of the thusly formed parts and attaching the cups together.

20. A method as claimed in claim 5 comprising cutting a brassiere-type cup out of the thusly formed sheet.

21. The product made according to claim 19.

22. The product made according to claim 20.

23. A method as claimed in claim 1 wherein the sheets are connected to each other by an adhesive.

* * * * *